United States Patent

Keeton

[11] 4,169,129
[45] Sep. 25, 1979

[54] SODIUM STORAGE AND INJECTION SYSTEM

[76] Inventor: Robert A. Frosch, Administrator of the National Aeronautics and Space Administration, with respect to an invention of Alvin R. Keeton, Finleyville, Pa.

[21] Appl. No.: 880,728

[22] Filed: Feb. 24, 1978

[51] Int. Cl.² ............... B01J 1/00; B01D 35/18; B05B 1/24; C01B 33/02
[52] U.S. Cl. ........................... 422/242; 210/186; 210/340; 239/102; 239/302; 422/187; 422/199; 422/208; 422/235; 423/350
[58] Field of Search ............... 23/252 R, 260, 285, 23/290; 137/113, 263, 256, 265, 266; 423/350, 348, 349 (U.S. only), 239/135, 302

[56] References Cited
U.S. PATENT DOCUMENTS

| | | | |
|---|---|---|---|
| 1,095,414 | 5/1914 | Ostermann | 239/135 |
| 1,792,551 | 2/1931 | Rice et al. | 239/135 |
| 1,988,719 | 1/1935 | Cotton | 23/285 X |
| 2,557,438 | 6/1951 | Johnson | 137/263 X |
| 2,863,558 | 12/1958 | Brondyke et al. | 210/186 X |
| 2,927,950 | 3/1960 | Mertes et al. | 23/260 UX |
| 3,248,093 | 4/1966 | Demaison | 239/135 X |
| 3,256,068 | 6/1966 | Burke, Jr. et al. | 23/285 |
| 3,345,304 | 10/1967 | Ross | 23/260 X |
| 4,027,595 | 6/1977 | Frank et al. | 210/340 X |

*Primary Examiner*—Joseph Scovronek
*Attorney, Agent, or Firm*—Monte F. Mott; John R. Manning; Wilfred Grifka

[57] ABSTRACT

A sodium storage and injection system for delivering atomized liquid sodium to a chemical reactor employed in the production of solar grade silicon. The system is adapted to accommodate start-up, shut-down, normal and emergency operations and is characterized by a jacketed injection nozzle adapted to atomize liquefied sodium and a supply circuit connected to the nozzle for delivering thereto liquefied sodium comprising a plurality of replaceable sodium containment vessels, a pump interposed between the vessels and the nozzle, and a pressurizing circuit including a source of inert gas connected with the vessels for maintaining the sodium under pressure.

5 Claims, 3 Drawing Figures

4,169,129

SODIUM STORAGE AND INJECTION SYSTEM

ORIGIN OF THE INVENTION

The invention described herein was made in the performance of work under a NASA contract and is subject to the provisions of Section 305 of the National Aeronautics and Space Act of 1958, Public law 85-568 (72 Stat. 435; 42 U.S.C. 2457).

BACKGROUND OF THE INVENTION

1. Field of the Invention

The invention relates generally to a sodium storage and injection system for delivering a fine spray of high purity sodium to a reactor, and more particularly to a storage and injection system for liquefied sodium having a capability of functioning in start-up, shut-down, normal operating and emergency modes for injecting liquefied sodium into an arc furnace for reducing silicon tetrachloride in the production of solar grade silicon.

As disclosed in U.S. application Ser. No. 873,993, filed Jan. 31, 1978, incorporated herein by reference thereto, substantial attention currently is being given to the use of silicon solar cells in converting solar energy directly to electrical energy. As is well known, silicon solar cells are characterized by photovoltaic capabilities and heretofore have been employed extensively in the aerospace industry, particularly in the exploration of celestial space. Unfortunately, extensive use of solar cells for converting solar energy to electrical energy in a terrestrial environment has been impaired, in part, by the relatively insufficient supply of solar grade silicon.

With a view to enhancing usage of solar cells in the production of energy, efforts are being made to increase the supply of solar grade silicon. Such has led to a suggestion of various production techniques including a process wherein solar grade silicon is produced through a reduction of silicon tetrachloride using sodium in the presence of heat above the melting point of silicon. This technique requires that silicon tetrachloride of a relatively high purity be injected into an arc furnace, or similar reactor, simultaneously with the reductant sodium. Any system employed in performing this process must possess a production capacity sufficient to satisfy economic requirements. This, in turn, requires that accurate control be maintained over the delivery of the sodium and its injection into the reactor.

It is, therefore, the general purpose of the instant invention to provide a unique system for delivering and injecting a controlled spray of high purity sodium under pressure into a chemical reactor.

OBJECTS AND SUMMARY OF THE INVENTION

It is an object of the instant invention to provide a sodium storage and injection system for delivering a fine spray of high purity sodium to a chemical reactor.

It is another object to provide a storage and injection system for delivering liquid sodium to a chemical reactor under pressures sufficient to assure a reduction of silicon tetrachloride concurrently delivered to the reactor.

It is another object to provide a storage and injection system for delivering liquefied sodium to a chemical reactor adapted to function in start-up, shut-down, normal and emergency modes.

It is another object to provide in combination with a sodium storage and injection system an atomizing nozzle characterized by a jacket through which is circulated temperature control fluid.

These and other objects and advantages are achieved through a system including an injection nozzle for atomizing liquid sodium, a delivery circuit for delivering to the nozzle a pressurized flow of sodium, including a plurality of pressurized sodium containment vessels, a pump and a gas pressurizing circuit connected with the delivery circuit for pressurizing the containment vessels and purging the circuit whereby operations in start-up, shut-down, normal and emergency modes in order to facilitate controlled delivery and injection of sodium into a reactor, as will become more readily apparent in view of the following description and claims in light of the accompanying drawings.

DESCRIPTION OF THE PREFERRED EMBODIMENT

Figure 1:
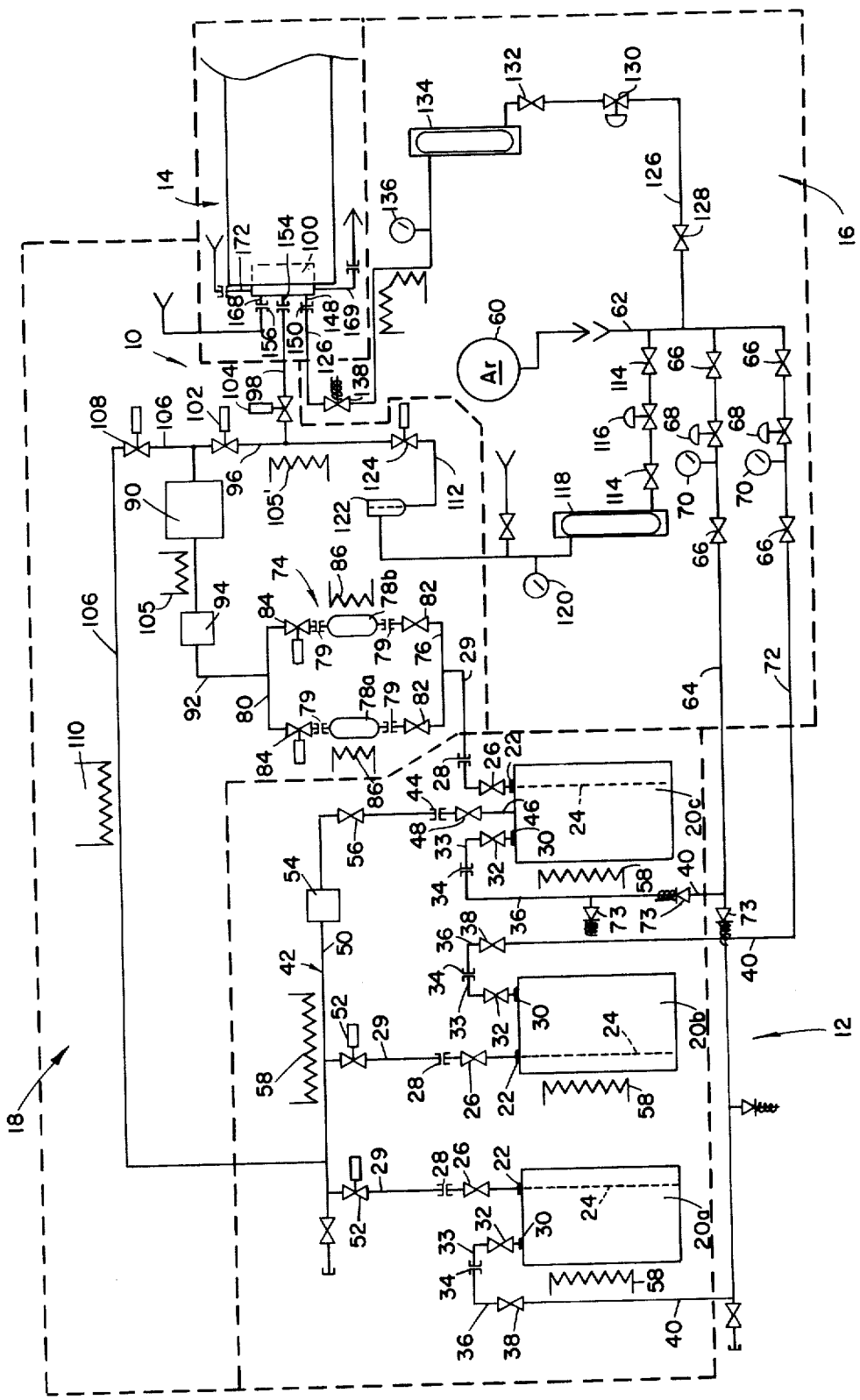
FIG. 1 is a diagrammatic view of a sodium storage and injection system which embodies the principles of the instant invention.

Referring now with more particularity to the drawings, wherein like reference characters designate like or corresponding parts throughout the several views, there is shown in FIG. 1 a sodium storage and injection system embodying the principles of the instant invention. As shown in FIG. 1 the system 10 includes a sodium storage subcircuit 12, a reactor 14, a gas delivery subcircuit 16 and a sodium delivery subcircuit 18 connected with the reactor 14 and the sodium storage subcircuit 12 in a manner hereinafter more fully described.

Turning first to the sodium storage subcircuit 12, as shown in FIG. 1, it can be seen that there are included in the subcircuit 12 three sodium storage drums designated 20a, 20b and 20c. The drums 20a, 20b and 20c are formed of a suitable material compatible with liquid sodium. As shown, each of the drums 20a through 20 c comprises a three hundred pound drum and has connected at its bung hole a suitable fitting, designated 22. The fitting 22 is adapted to connect with the drum, or stinger, extraction tube designated 24. The extraction tube 24 is inserted through the bung and extends downwardly from the fitting 22 for accommodating an extraction of liquid sodium from the drum with which it is inserted. As a practical matter, each of the extraction tubes is connected in communication with a flow control valve 26, which, for the sake of convenience, is illustrated as a hand operated valve.

To each of the valves 26 there is connected a disconnect coupling 28, of a suitable design provided for coupling the stinger 24 to a discharge line 29. Since the disconnect couplings 28 are commercially available and form no specific part of the instant invention, a detailed description thereof is omitted. However, it is to be understood that each of the couplings 28 serves to releasably connect the associated valve 26 to a discharge line 29.

Also connected with each of the drums 20a, 20b and 20c there is a gas injection fitting 30, which, like the fitting 22, is of a suitable design. The purpose of the fitting 30 is to accommodate injection of an inert gas, such as Argon, to the associated drum. Since the fitting 30 is commercially available, forms no specific part of the instant invention, and may be varied as desired, a detailed description of the fitting is omitted.

However, it should be understood that each fitting 30 is connected through a suitable nipple, not designated, to a hand operated valve 32 and that to each hand operated valve 32 there is connected, through a suitable conduit 33, a disconnect coupling 34. The disconnect couplings 34, like the couplings 28 are of an available design and serve to releasably connect the valves 32 with gas delivery conduits 36. These conduits, as shown, comprise terminal segments of the gas delivery subcircuit 16. To each of the conduits 36 there is connected a hand operated valve 38 which, in turn, is connected to a gas supply line 40. The purpose of the gas supply line 40 is to serve as a constant, pressurized source of inert gas.

It should, at this juncture, be apparent that each of the drums 20a, 20b and 20c is connected within the sodium storage subcircuit 12 in a manner such that it may be disconnected and replaced for purposes of recharging the sodium storage subcircuit, independently of the other. Additionally, it should be appreciated that the valves 26 and 32 serve to terminate the flow of fluid from the drums for preventing discharge therefrom while valves 38 prevent an accidental discharge from the lines 40 within which the valves are connected.

As a practical matter, while the drums 20a, 20b and 20c collectively serve as a reservoir, for liquid sodium, the drums 20a and 20b serve to supply the drum 20c, each independently of the other. A manifold 42 comprising a conduit connected with each of the lines 29 is connected to the drum 20c at a disconnect coupling 44. This coupling serves to connect the manifold 42 with a supply line 46 connected in communication with the drum 20c. Within the line 46 there is connected a hand operated valve 48. In practice, the drum 20c functions as the primary source of sodium for the system while the drums 20a and 20b comprise replaceable drums which serve to recharge the supply drum 20c, via the manifold 42.

The manifold 42, as shown, includes a conduit 50 to which each of the discharge lines 29 is connected, via a remote actuated valve 52. Within the conduit 50 there also is connected a flow meter 54 of suitable design. As a practical matter, a hand operated valve 56 also is connected in the conduit 50 and serves to open and close the conduit 50 for purposes of facilitating a disconnection and/or removal of the drum 20c from the sodium storage subcircuit 12.

As is well known, liquid sodium tends to freeze at temperatures above normal room temperatures but flows quite readily at temperatures at well below 150° C. Therefore, a resistance heater, designated 58, is provided and mounted in close proximity with each of the drums 20a, 20b and 20c for purposes of maintaining the sodium contained therewithin at an essentially constant temperature of 150° C. Similarly, and for similar reasons, a resistance heater 58 is connected in close proximity with the conduit 50 in order to facilitate the transfer of liquid sodium from the drums 20a and 20b to the drum 20c, via the manifold 42.

In order to supply an inert gas, such as Argon, to the gas delivery conduit 36 there is connected within gas delivery subcircuit 16 a tank 60 having connected thereto a gas main 62. To the main 62 there is connected a gas delivery lateral 64. In practice, the lateral 64 includes a pair of hand operated valves 66 between which a pressure control valve 68 is connected. In practice, a gauge 70 also is connected with the lateral 64, downstream of the pressure control valve for thus affording a constant read-out of pressures established within the lateral 64. Hence, once the valves 66 are open, gas from the tank 60 is delivered to the gas supply lines 40 via the main 62 and the lateral 64 connected thereto.

Of course, it is to be understood that the pressure control valve 68 functions to meter the gas passing through the lateral 64 so that the pressure within the supply drums 20a, 20b and 20c remains at a predetermined, substantially constant value. Additionally, in order to prevent overpressurization of the drums 20a, 20b and 20c there is connected within the lateral 64, as well as within the gas delivery conduit 36 and supply line 40 for the drum 20c, pressure relief valves 73, the purpose of which is to accommodate a "bleeding-off" of excess pressures above a selected valve.

In those instances in which redundancy is desired, a second lateral 72 is connected between the main 62 and the lateral 64, downstream from the valves 66 and 68. The lateral 72 also is provided with hand operated valves 66 and a pressure control valve 68, as well as a gauge 70. Consequently, should the pressure control valve 68 within the lateral 64 malfunction, gas is supplied via the lateral 72 to the gas supply lines 40.

Liquid sodium is introduced into the sodium delivery subcircuit 18 via a bifurcated filter unit 74. This unit is connected to the drum 20c, at the disconnect coupling 28, via the discharge line 29. The filter unit 74, in practice, includes an intake header 76 extended between a pair of micro-metallic sodium filter components 78a and 78b of similar design. Couplings 79 are employed to connect the header 80. Since micro-metallic filter components 78a and 78b are commercially available, a detailed description of these components is omitted in the interest of brevity. However, it is to be understood that these filters 78a and 78b are interposed between the headers 76 and 80 and operate alternatively to maintain a flow of sodium through filter unit 74 so that the other filter component of the pair may be removed and replaced without interrupting the operation of the system 10.

In practice, a pair of hand operated valves 82 is provided and connected between the intake header 76 and the disconnect couplings 79, for each of the filter components of the pair, whereby flow to each of the filter components may be interrupted in a selective fashion. Moreover, at the downstream or discharge side of each of the filter components 78a and 78b there is connected between the disconnect coupling 79 and the header 80 a remote actuated valve 84. This valve facilitates an automatic interruption of the flow, from either of the filter components to the commonly connected header 80.

The filter unit 74 also is provided with a pair of resistance heaters 86 similar in design and function to the heaters 58, disposed in close proximity to the filter components 78a and 78b. The purpose of the heaters 58 is to prevent freezing of liquid sodium within the filter components 78a and 78b.

To the discharge header 80 there is connected the intake of a system pump 90, of suitable design. Since substantially high pressures must be developed within the system 10 and the containment vessels 20a, 20b and 20c normally are not constructed to withstand substantially high over-pressures, the pump 90 comprises a positive displacement electro-magnetic pump obtainable from the Interspace Corporation, Arroy, New York. As currently employed, the pump has a delivery capacity of one hundred gallons per hour, at fourteen p.s.i. (pounds per square inch). The pump 90 is connected with the discharge header 80 through a supply line 92 having connected therein a flow meter 94, also of a suitable design.

To the discharge side of the pump 90 there is connected a delivery conduit 96 which is, in turn, coupled with a line 98 comprising a feeder main for a sodium injection nozzle 100 mounted in communication with the reactor 14. Within the delivery conduit 96 there is connected a remote actuated valve 102, while a remote actuated valve 104 is connected within the feeder main. Consequently, liquid sodium flowing from the pump 90 to the nozzle 100 is required to pass through the valves 102 and 104.

Again, where so desired, a resistance heater 105 is provided for assuring that the sodium within the line 92 remains in its liquid state and a heater 105' is provided adjacent the conduit 96 to assure that the sodium does not freeze prior to being delivered from the pump 90 to the nozzle 100.

The nozzle 100, as will hereinafter be more fully described, comprises an atomizing nozzle bearing the trademark Sonicore and is obtainable from the Sonic Development Corporation, Upper Saddle River, New Jersey. This nozzle serves to break-up liquid sodium with self induced sonic energy pulses and provides small particle sizes at comparatively large liquid flow rates. For example, suitable particle sizes are obtainable at liquid flow rates of above one hundred g.p.h. (gallons per hour) and fourteen p.s.i. (pounds per square inch) when co-injected with gas at a flow rate of thirty-six cubic feet per minute and eleven p.s.i.

Where desired, a bypass system is provided so that liquid sodium may be circulated back to the sodium storage subcircuit rather than being delivered to the nozzle 100 via the delivery circuit 96. This system includes a line 106 connected between the discharge side of the pump 90 and the manifold 42. To achieve a bypass the line 106 is provided with a remote actuated valve 108, similar to the valve 102. Consequently, the bypass line 106 is opened and closed at the valve 108, alternatively with respect to the opening and closing of the valve 102.

A resistance heater 110, of a design similar to the resistance heaters hereinbefore mentioned, is provided for purposes of assuring that sodium does not freeze within the line 106 as it is returned to the manifold 42.

Of course, at the end of each run it is desirable to purge the lines 92 and 98 as well as the line 106 for reasons believed to be apparent.

In order to facilitate purging of these lines there is connected to the subcircuit 18 the gas delivery subcircuit 16, aforementioned. Connection is made therebetween through a gas delivery line 112 also connected to the main 62. Within the line 112 there is connected a plurality of valves, including a pair of hand actuated valves 114 and an interposed pressure control valve 116. These valves are similar in design to the valves 66 and 68 aforementioned. In addition to the valves 114 and 116, there is connected in the gas delivery line 112 a gas flow meter 118. Also connected within the line 112 there is a pressure gauge 120, a vapor trap 122 and a remote actuated valve 124, the purpose of which is to establish and interrupt a flow of gas through the line 112 to the subcircuit 18.

Assuming for the moment that the valves 124 and 104 are open and the valve 102 is closed, a flow of gas under pressure can now be delivered through the line 98 for purging the line and nozzle 100 by opening the pair of valves 114. Alternatively, assuming the valves 102 and 108 are open and the valve 104 is closed the line 106 is purged in response to an opening of the valves 114. Of course, the pressure at which the gas is delivered is established at the valve 116.

In order to supply inert gas to the nozzle 100, for purposes which will hereinafter become apparent, there is coupled to the main 62 a delivery conduit 126. This conduit has connected therein, in series, a hand operated valve 128, a pressure control valve 130, a hand operated valve 132, a gas flow meter 134, a gauge 136 and a solenoid valve 138. The valves 128 and 132 are similar to the hand operated valves hereinbefore discussed, while the pressure control valve 130 is similar to the valves 68 and 116, also aforementioned. Additionally, the valve of the flow meter 134 is similar in design and construction to the flow meter 118, while the gauge 136 provides an indication of pressures maintained within the conduit 126 in a manner similar to that in which the gauges 70 function. The valve 138 is adapted to be remotely controled for purposes of controling the operation of the nozzle 100, as will become more readily apparent.

Figure 2:
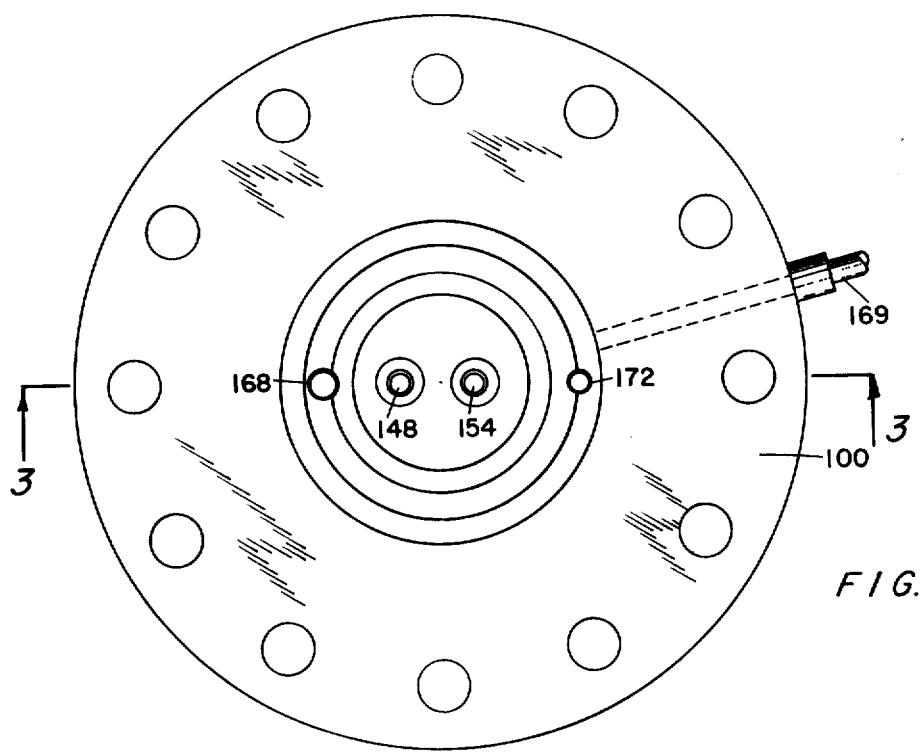
FIG. 2 is an end elevational view of an injection nozzle included within the system shown in FIG. 1.
Figure 3:
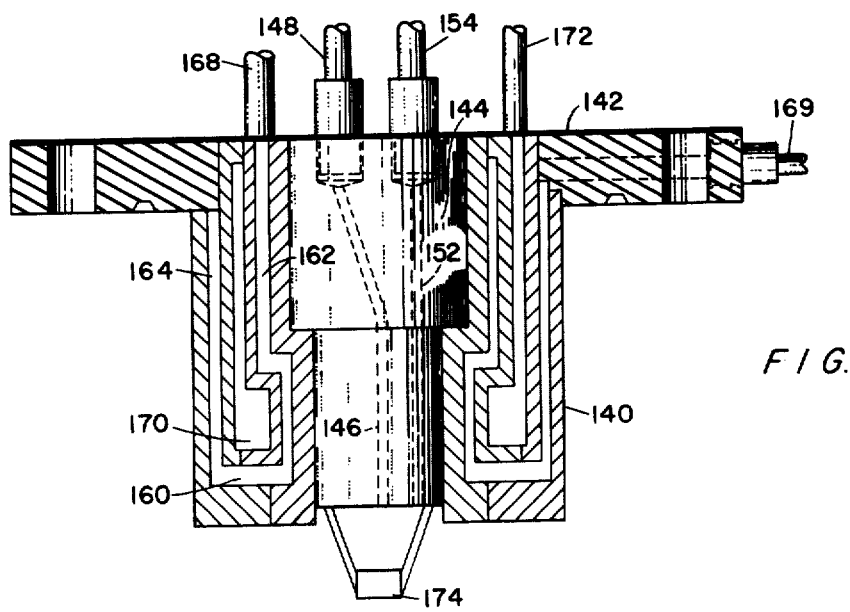
FIG. 3 is a cross sectional view taken generally along line 3—3 of FIG. 2.

Taking FIGS. 2 and 3 collectively, it can be seen that the nozzle 100 includes a housing 140 supported by a plate 142 and having a central core 144. The core 144 includes a concentric bore 146 extended axially through the core and connected with a gas delivery line 148. The gas delivery line 148 is, in turn, connected to the conduit 126 at a disconnect coupling 150. This coupling also is of a conventional design and similar to the disconnect couplings hereinbefore described.

The core 144 also includes a sodium delivery bore 152 extended in parallelism with the bore 146 and connected in communication with a supply line 154. The supply line 154 is, in turn, connected with the main 98 at a disconnect coupling 156, similar in design to the coupling 150.

Provided in circumscribing relation with the core 144 is a jacket forming an annular chamber 160 having concentric segments 162 and 164. The chamber 160 is connected with an inlet 168 and an outlet 169 through which a flow of coolant is established. As a practical matter, between the segments 162 and 164 there is provided an annular vacuum chamber 170 having a vacuum line 172 connected in communication therewith for facilitating an establishment of a vacuum in the chamber 170.

The purpose of the chamber 170 is, of course, simply to insulate the segments of the chamber 160 and thus impair transfer of heat between the segments. The inlet 168 and outlet 169, as well as the vacuum line 172 are connected to suitable conduits, not designated, employing disconnect couplings, also not designated, similar in design to the disconnect couplings hereinbefore mentioned.

Since the nozzle 100 is known and the details thereof form no specific part of the instant invention, a detailed description of the nozzle is omitted in the interest of brevity. However, as an aid to understanding the operation of the nozzle 100, it should be noted that the nozzle includes a sonic atomizing cup 174 disposed in axial alignment with the bores 146 and 152 so that as the sodium and Argon are simultaneously impelled against the surface of the cup 174, self-induced energy serves to atomize the sodium.

Additionally, while various coolants may be employed, sodium-potassium eutectic NaK 78 has been chosen because it is compatible with the system and can operate effectively throughout the required temperature range.

It is important to understand that the specific material from which the components of the system are fabricated is varied as desired. One metal particularly suited for use in the fabrication of component parts is 300-stainless steel. However, the sodium injection nozzle 100 preferably is fabricated from Monel or other alloys that will not contaminate silicon products.

OPERATION

It is believed that in view of the foregoing description, the operation of the device will readily be understood and it will be briefly reviewed at this point.

Assume that the drums 20a, 20b and 20c are substantially filled with liquid sodium, maintained at a suitable temperature by the heater 58, operation of the system 10 is operated simply by initiating operation of the pump 90, for drawing liquid sodium from the drum 20c through one leg of the filter unit 74. The leg through which the flow is established is determined as a consequence of the selection of valves 82 and 84. With the valve 108 closed and the valves 102 and 104 open a flow of sodium is established to the supply line or feeder main 98 for the nozzle 100.

Simultaneously, a flow of gas under pressure is delivered to the nozzle 100 via the conduit 126 and the line 148. The nozzle 100 injects atomized liquid sodium to the reactor 14. The sodium is injected as a fine spray of particles so that complete vaporization occurs within reasonable axial length of the arc heated chemical reactor chamber. Particles with medium volume, diameters of less than one hundred microns, are desired.

Should the flow to the pump 90 be reduced because of the failure of one of the filter components 78a or 78b, a flow through the other filter component is established, simply by closing and opening appropriate valves 82 and 84. The clogged filter is then freed for removal, at the couplings 79, removed for reconditioning, and thereafter replaced, employing the disconnect couplings 79.

During the operation of the system 10 a standing flow of inert gas from the tank 60 is delivered via the lateral 64 and 72 to the drums 20a, 20b and 20c so that these drums remain substantially pressurized as liquid sodium is drawn therefrom. However, it is preferred that the pressure within the drum 20c be less than the pressures within the drums 20a and 20b so that siphoning-over of the liquid sodium from the drums 20a and 20b through the manifold 42 to the drum 20c is achieved. Such siphoning is controlled simply by opening and closing appropriate valves 26 and 52. In the event of a depletion of the contents in either of the drums 20a or 20b the drum is removed from the sodium storage subcircuit 12 and replaced by a full drum, while the drum 20c remains in place. Hence, throughout the operation of the system 10 the drum 20c remains on-line even though the drums 20a and 20b are alternatively removed and replaced, for thus assuring that a constant supply of liquid sodium for the drum 20c is maintained.

Following an operation of the system 10 it is desirable to purge the lines 98 or 106 as the case may be. Purging is effected simply by opening appropriate valves 114, 116, 124 or 104, where it is desired to purge the line 98. Should it be desirable to purge the line 106 the valve 104 is closed while the valves 102 and 108 are opened for thus permitting a flow of gas to be established through the bypass line 106 to the manifold 42.

In instances where it is desirable to continue operation of the pump 90, while terminating the flow of sodium through the nozzle 100, the valve 102 is closed while the valve 108 is opened for thus accommodating a bypass of the liquid sodium from the pump 90 back to the manifold 42. Thus the bypass line 106 accommodates a recirculation of the sodium for permitting system checkout.

In view of the foregoing, it should readily be apparent that operation of the system 10 permits sodium to flow into the drum 20c from either of the two other drums 20a and 20b, through the flow meter 54. When one drum runs empty, the resultant loss of flow serves as a signal for switching the sodium feed to the other of the two drums 20a or 20b, employing the valves 52, allowing the empty drum to be removed and replaced without interrupting the operation of the system. Similarly, the filter components 78a and 78b are alternatively employed and removed without interrupting the flow of sodium through the system.

In view of the foregoing, it is believed that the instant invention provides a practical system adapted to supply continuous flow of sodium to a chemical reactor at rates suitable for commercially producing solar grade silicon.

What I claim is:

1. A sodium storage and injection system for delivering liquefied sodium to a chemical reactor comprising:
   A. an injection nozzle adapted to be connected to a chemical reactor for delivering thereto liquefied sodium; and
   B. means connected with said nozzle for delivering thereto liquefied sodium including
      (1) a first sodium containment drum, circuit means including a conduit connecting said first drum to said nozzle, and a pump interposed in said circuit means for continuously discharging the first drum through the nozzle, and
      (2) means for continuously recharging said first drum including a second and a third sodium containment drum, each being charged independently of the other, feeder means including a feeder conduit extended from said first drum, coupling means for releasably connecting said second and third drums to said feeder conduit, each independently of the other, valve means for alternatively establishing communication between said first drum and said second and third drums, means for selectively establishing between said first drum and said second and third drums a pressure differential sufficient to effect a siphoning of liquefied sodium from said second and third drums to said first drum, including a pressurized source of inert gas, and means for connecting said source of gas to said first, second and third drums.

2. The system of claim 1 further comprising means including a filter connected in said circuit means between said pump and said first sodium containment vessel.

3. The system of claim 2 wherein said filter unit includes means defining therethrough a bifurcated path.

4. The system of claim 2 further comprising means for maintaining the sodium at a constant temperature as it is delivered from the second and third sodium containment drums to said nozzle.

5. The system of claim 4 wherein said means for maintaining the sodium at a constant temperature includes means for heating said circuit.

* * * * *